United States Patent [19]
Ferrara, Jr.

[11] Patent Number: 5,165,327
[45] Date of Patent: Nov. 24, 1992

[54] COFFEEMAKER

[76] Inventor: Daniel R. Ferrara, Jr., 221 Looking Glass Hill, Bantam, Conn. 06750

[21] Appl. No.: 687,495

[22] Filed: Apr. 19, 1991

[51] Int. Cl.[5] .......................................... A47J 31/00
[52] U.S. Cl. ........................................ 99/307; 99/295; 220/502; 220/912
[58] Field of Search ................. 99/279, 295, 307, 313, 99/318, 319, 291, 298, 300, 302 R, 304, 306; 426/433; 220/502, 912

[56]  References Cited

U.S. PATENT DOCUMENTS

| | | | |
|---|---|---|---|
| 1,158,421 | 11/1915 | Abtmeyer | 99/313 |
| 4,793,246 | 12/1988 | Barradas | 99/307 |
| 4,825,759 | 5/1989 | Grome | 99/307 |
| 5,046,409 | 9/1991 | Henn | 99/307 |

FOREIGN PATENT DOCUMENTS 28463 of 1907 United Kingdom ................. 99/307

Primary Examiner—Robert W. Jenkins
Attorney, Agent, or Firm—Haynes N. Johnson

[57]  ABSTRACT

A coffeemaker with a stand and a carafe. The stand includes a receiving tray to hold the carafe and keep the coffee hot, a water heater, and a basket for holding ground coffee and receiving heated water. The carafe has two concentric chambers of about equal volume. The inner chamber receives freshly made coffee and holds it prior to pouring. The outer cylinder is a reservoir to hold water prior to its being heated to make coffee. After the coffee has been made, the outer chamber is empty and acts as an insulator for the coffee in the inner chamber. A water-receiving tube in the stand presses a valve on the reservoir, opening it, so that the water in the reservoir flows into a water heater in the stand and, after heating, is directed to the coffee-holding filter at the top of the stand.

27 Claims, 5 Drawing Sheets

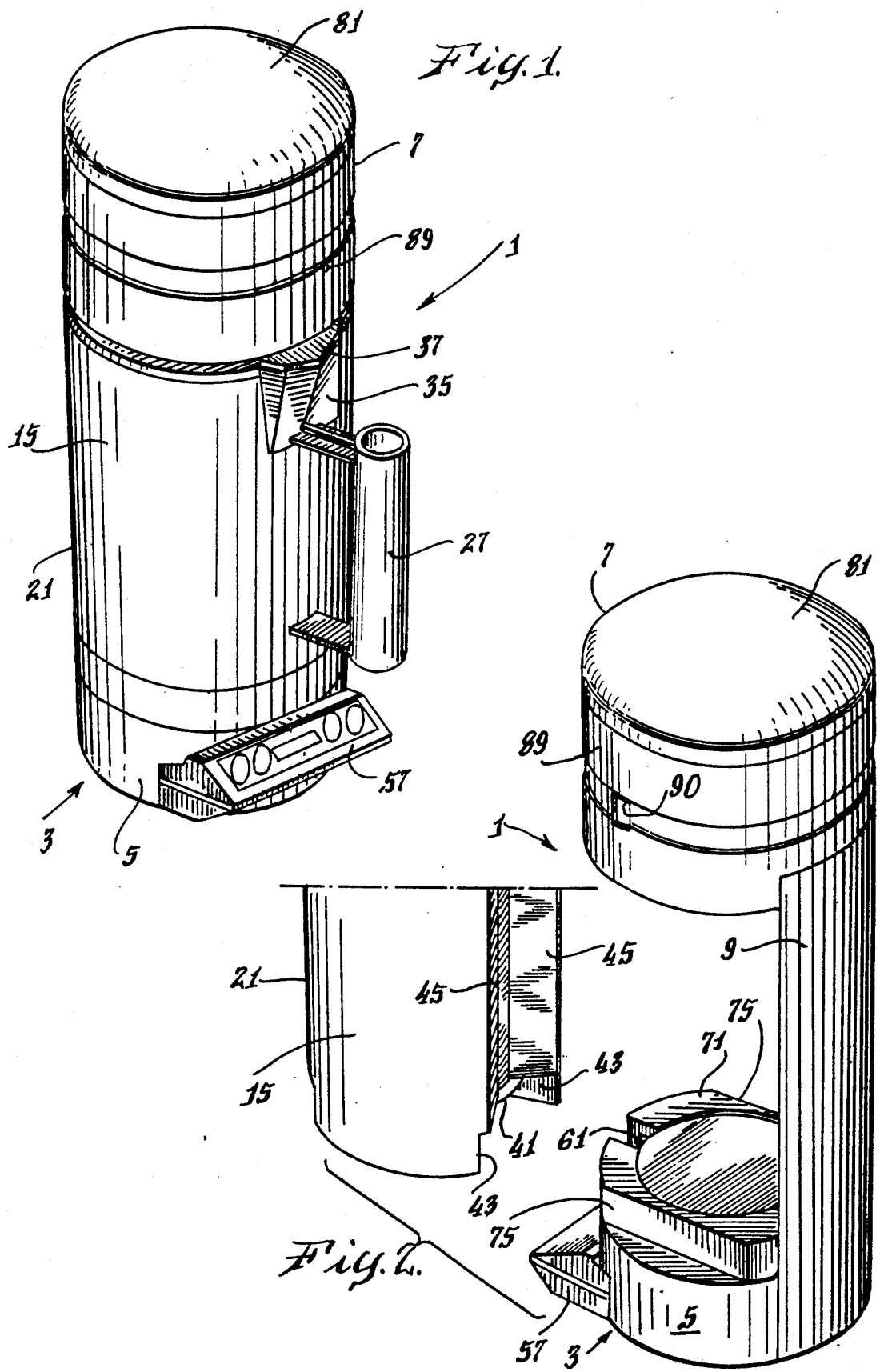

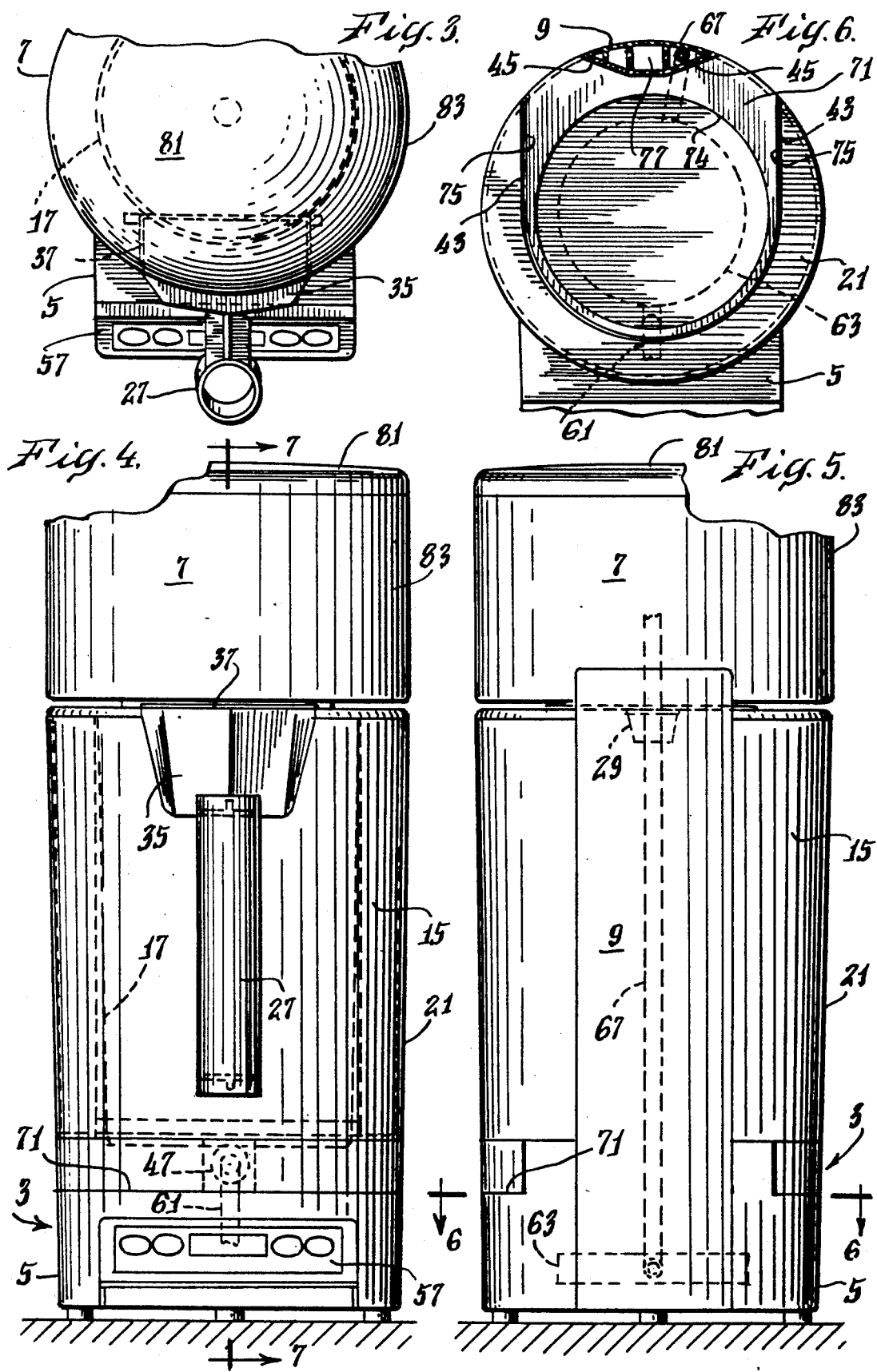

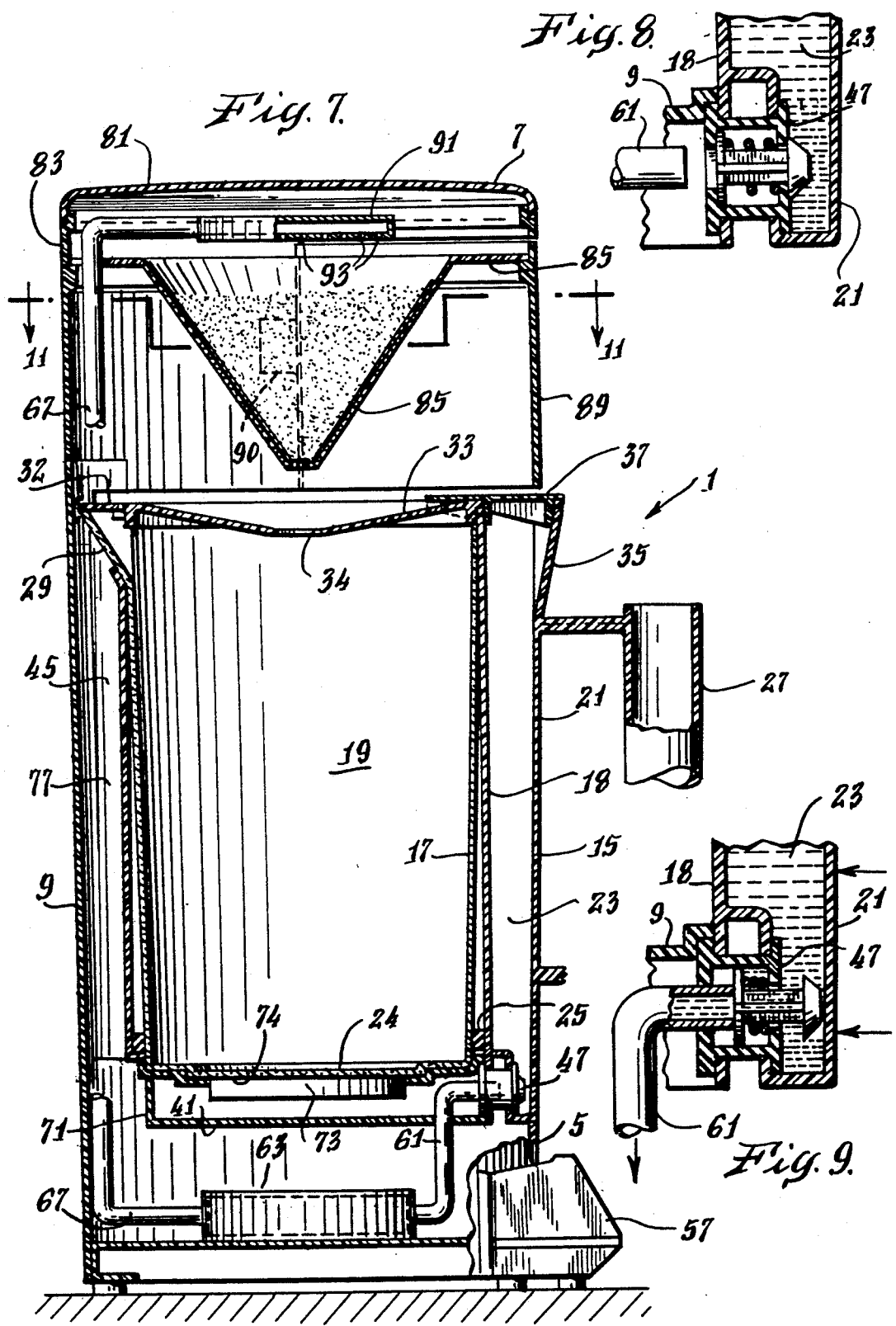

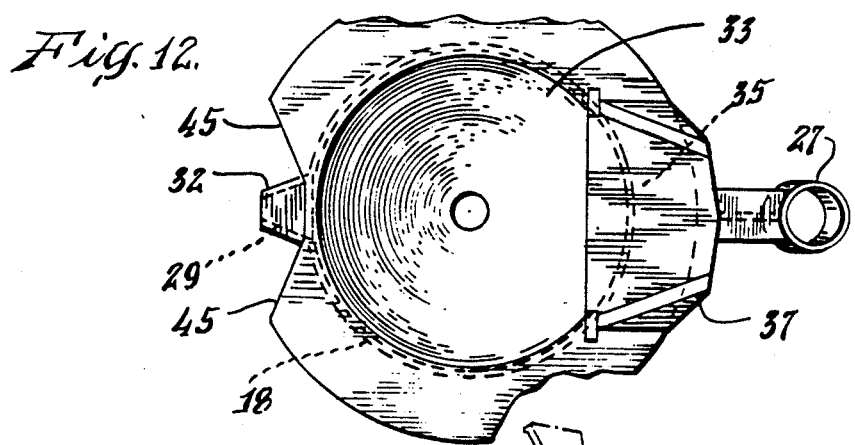
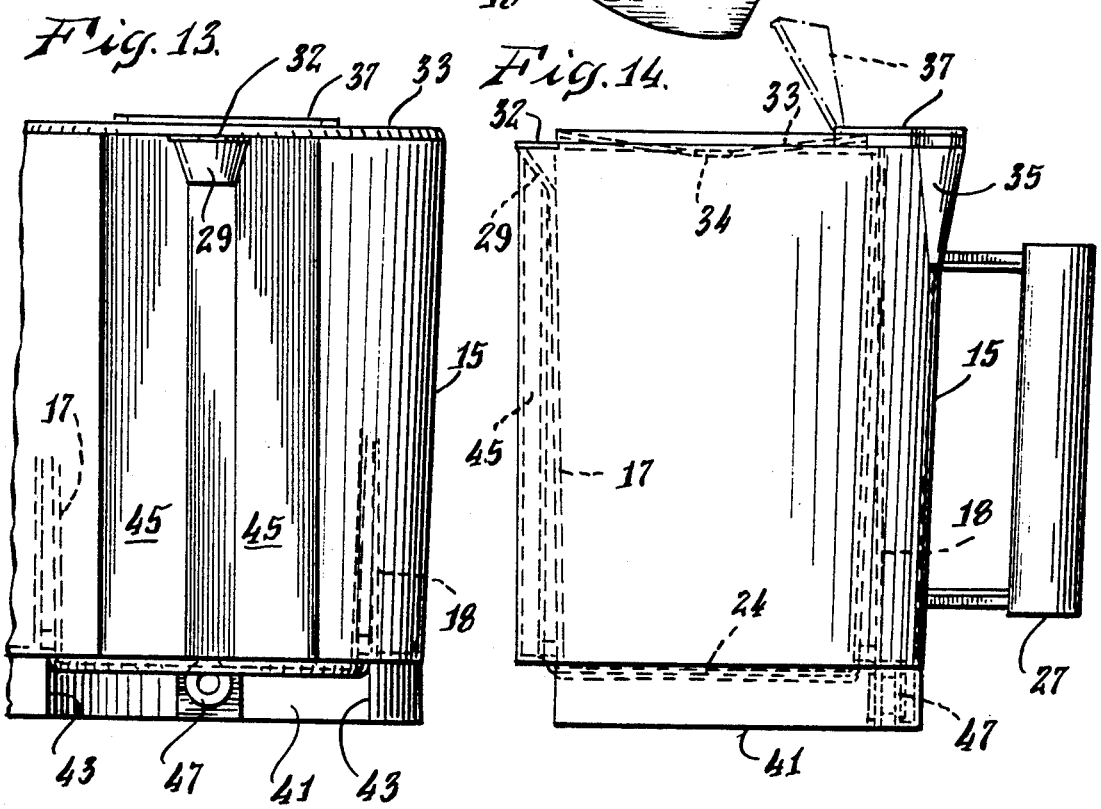
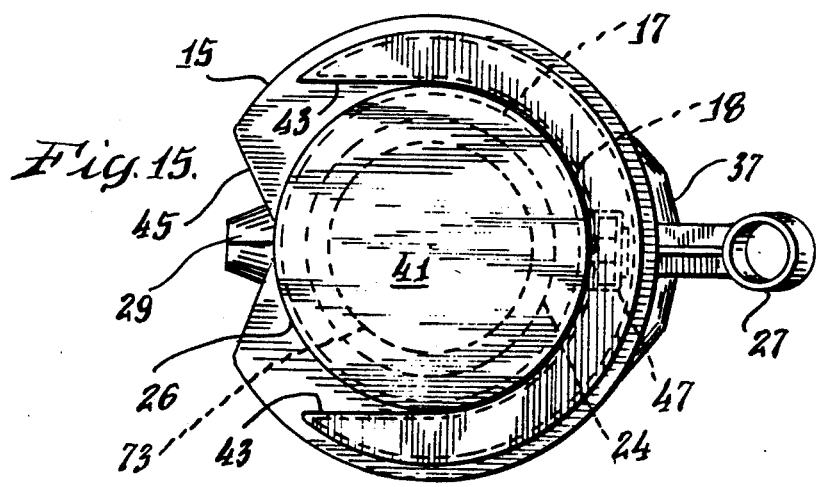

5,165,327

COFFEEMAKER

FIELD OF THE INVENTION

This invention relates to the field of automatic electric coffeemakers and, in particular, to those coffeemakers which have a carafe for receiving the coffee as it is made and for pouring the coffee.

BRIEF SUMMARY OF THE DISCLOSURE

My coffeemaker includes a stand and an interfitting carafe. The stand includes a receiving tray to hold the carafe and keep the coffee hot, means for heating water, and a basket for holding ground coffee and receiving heated water. The stand does not include a reservoir for holding water to be heated; rather, the reservoir is part of the carafe; and, as a result, the coffeemaker is of reduced size and eliminates the need for additional filling vessels.

The carafe has two concentric chambers of about equal volume. The inner chamber receives freshly made coffee and holds it prior to pouring. The outer chamber is a reservoir to hold water prior to its being heated to make coffee. The inner chamber may be a glass container held in position within the outer chamber. After the coffee has been made, the outer chamber is empty and acts as an insulator for the coffee in the inner chamber.

The shape of the base of the carafe and the receiving tray of the stand are shaped for complementary fit. They have a shape such that the carafe can be placed on the stand only by sliding it horizontally and only in one angular position. As a result, when placing the carafe on the stand, a water-receiving tube in the stand meets and presses against a valve on the reservoir, opening it, so that the water in the reservoir flows into the water-receiving tube.

The entering water passes into the water heater, is heated, and is then forced by vapor pressure to go up a tube in the back of the stand and flow over the ground coffee. After dripping through the coffee, the water, now freshly-made coffee enters the inner chamber of the carafe. It can be poured from the inner chamber through a spout.

DESCRIPTION OF THE DRAWINGS

FIG. 1 is a perspective view of my coffeemaker with the carafe in place on the stand.

FIG. 2 is an exploded perspective view showing the carafe in position to be placed upon the stand.

FIG. 3 is a top plan view of the coffeemaker, partially broken away, to show the inlet for water entering the outer chamber.

FIG. 4 is a front elevation of my coffeemaker.

FIG. 5 is a rear elevation of my coffeemaker.

FIG. 6 is a horizontal section, taken on line 6—6 of FIG. 5, showing the tube which carries hot water from the base of the stand to the basket holding the ground coffee.

FIG. 7 is a vertical section, taken on line 7—7 of FIG. 4.

FIG. 8 is a top plan view, partially broken away.

FIG. 9 is horizontal section, taken on line 9—9 of FIG. 7, showing the ground coffee basket area, but with the entry door open.

FIG. 12 is a top plan view of the carafe.

FIG. 13 is a bottom plan view of the carafe and stand.

FIG. 14 is side elevation of the carafe.

FIG. 15 is a bottom plan view of the carafe and stand.

DETAILED DESCRIPTION OF THE INVENTION

Figure 10:
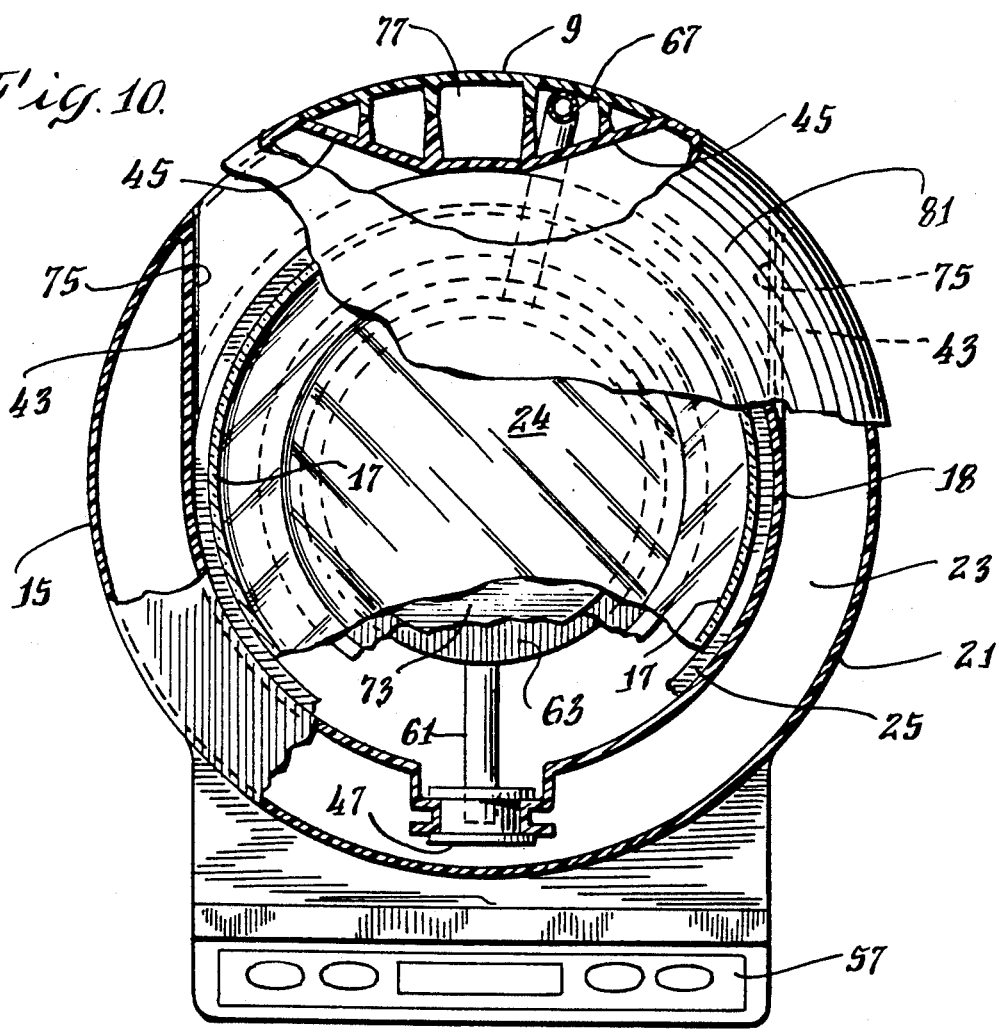
FIG. 10 is a top plan view of the carafe.

My coffeemaker 1 includes two interfitting but separable parts, a stand 3 and a carafe 15. The stand, formed of plastic, includes a base 5, a top section 7, and a vertical riser 9 which supports the top over the base. The spacing between the top of the base and the bottom of the top section is just sufficient to receive the carafe 15 in complementary fit.

The carafe has double concentric side walls, inner wall 17 and outer wall 21, a handle 27 being molded to the outer wall. Inner wall 17 forms inner chamber 19; and outer wall 21 forms outer chamber 23. The inner chamber has bottom 24. The outer chamber 23 is to hold water which is to be made into coffee; and the inner chamber 19 holds the coffee after it is made. The inner and outer walls need not necessarily be circular, but can be of any desired configuration, such as square. However, it is desirable, for appearance, that the shape of the base and of the top section be of the same shape and dimensions as the outer wall.

The inner and outer chambers are dimensioned to hold approximately the same volumes of liquid. Thus, one can fill the outer chamber with water, and the resulting volume of coffee will just fill the inner chamber.

Preferably inner wall 17 is part of a glass container. In such case, a supporting wall 18 is fixed inside outer wall 21 to hold the container in position.

A water inlet 35 with a hinged cover 37 is at the top of the outer chamber adjacent to handle 27 and overlaps the edge of the outer chamber. This cover can be snapped into an open position when water is being poured. It will then act as a trough with three sides to direct water into the outer chamber and as a baffle to prevent water from accidently spilling into the inner chamber.

A coffee pouring spout 29 is part of inner chamber 19. The spout has a hinged cover 32. The spout is on the opposite side of the carafe from the water inlet 35. The top is formed as a funnel 33 with a center opening 34 to receive freshly-brewed coffee. If a glass container is used the spout and channel can be an integral part of the glass container, and the spout will serve to center and position the container within supporting wall 18.

The base of the carafe has a central horizontal recess 41 running from front to back, that is, in a direction parallelling the direction from the handle to the spout. The recess is open at the front end, the spout end, and closed at the back end beneath the handle. This recess fits in complementary relationship over a base surface 41 to align the carafe with the base and hold it in position. Sides 43 of the carafe extend downwardly on each side of recess 41. Thus, the carafe can only be placed upon the base by a horizontal sliding movement, and it is positioned in a specific predetermined orientation. It is held in this orientation by the interfitting of a downwardly extending circular portion of the base into a complementary space 74 above the heater 73 in the base.

A valve 47 is positioned on the carafe within the rear end of the recess, the valve being connected to the bottom of outer chamber 23. The valve is designed to open when a tube is inserted horizontally from the side. The valve is the means by which water is removed from the outer chamber when coffee is to be made.

Base 5 carries electrical switch panel 57 and also serves to hold the carafe 15, to support riser 9 and top section 7, and to include the heating elements. The latter include electrical water heater 63 and/or a thermostatically controlled thermistor heater 73, positioned above the water heater and in carafe receiving tray 71. Heater 63 raises the water temperature to about 203° to 205° F. The circuitry may provide for automatically turning off heater 63, or cycling to a keep warm temperature of about 185° F., when the coffee has been brewed.

The heater reaches a temperature of about 185° and is used to maintain the coffee warm; and it is so dimensioned as to fit immediately below the inner chamber 17.

The upper portion of base 5 is shaped to form a base surface 75 to receive carafe recess 41, and its shape is complementary to that of the recess 41. Thus, the carafe 15 can be slid spout end first over surface 75 until stopped by valve interference. It will then be so positioned that the inner chamber 19 is positioned over heater 73.

A valve-engaging tube 61 leads from the end of the area of base surface 75 in a direction opposite to the riser end. It is so located that when the carafe is pushed in over surface 75, tube 61 presses against valve 47 in the carafe, opening it, so that water in outer chamber 23 can enter tube 61. Tube 61 carries the water to hot water heater 63 and may include appropriate check valves.

As with many other coffeemakers, once the water is heated sufficiently in heater 63, vapor pressure causes the water to be forced upwardly. In this instance the water leaves heater 63 through water discharge tube 67, which tube passes through tube chamber 77 in vertical riser 9 and upwardly into top section 7 (FIGS. 6, 7, and 8).

The front, spout end of carafe 15 is indented in a vertical recess 45 for complementary fitting against riser 9.

Figure 11:
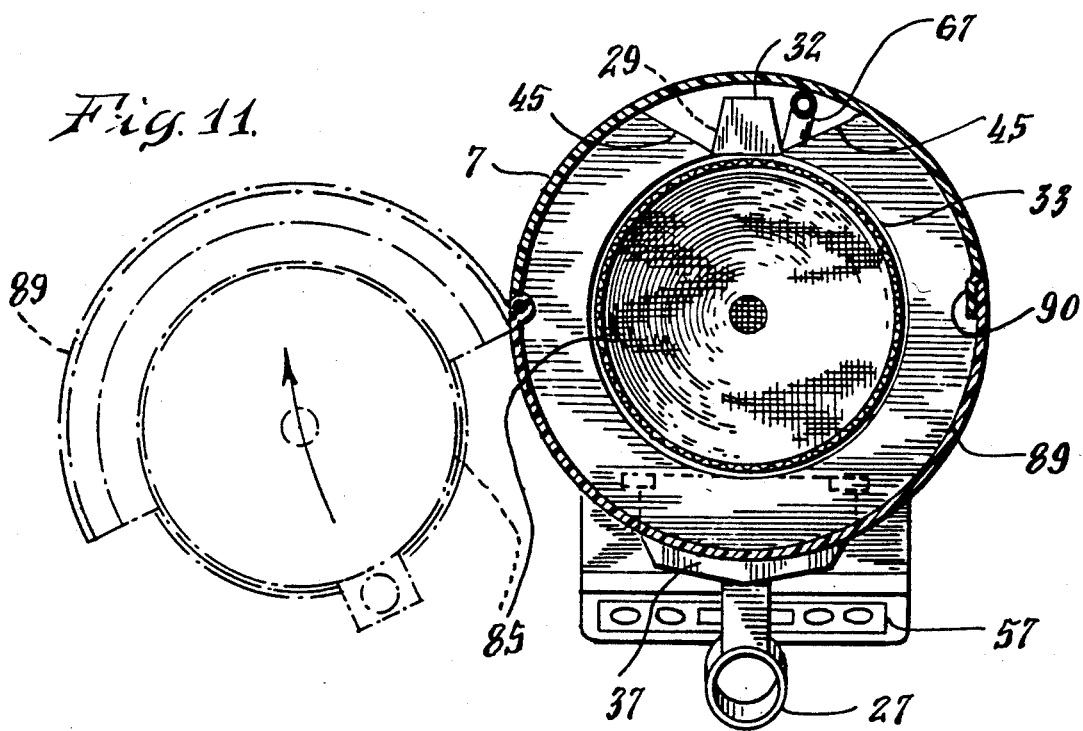
FIG. 11 is a front end elevation showing the recess beneath the carafe, made for complementary interfit with the stand.

Top section 9 is where the coffee is brewed. It includes a top 81 and sides 83. A portion of sides 83 form a hinged door 89 which carries a conical filter support or basket 85, of the usual type, to hold the ground coffee (FIG. 11). Basket 85 is perforated on the bottom so that the coffee can flow downwardly to funnel 33 and then into the inner chamber 19. The height of the bottom edge of sides 83 is such that they almost touch the top of the sides of the carafe when it is in position. This provides a compact, functional unit with a pleasing appearance.

Hot water discharge tube 67 leads to perforated disk 91, with holes 93, positioned over basket 85. Thus, water heated by heater 63 passes through tube 67 to disk 91 and from there into the coffee grounds. The brewed coffee goes from there to inner chamber 1 where it is kept hot by heater 73 until wanted.

It should be noted that the coffee in the inner chamber is well insulated. The top of chamber 19 is essentially closed by funnel 33, and the upper edge of outer wall 21 is almost contiguous with the bottom edges of the sides 83 of the top section. In addition, outer chamber 23, being empty, serves as an insulator for inner chamber 19. Accordingly, the coffee can be kept hot with but little heat from the heater 73.

My coffeemaker has the customary electrical wiring for such units, and can be controlled by the usual switches for "off-on", "brew", and for "keep warm".

In use, one places a filter and coffee in basket 85 and removes the carafe from the base and fills the outer chamber 23 with water through water inlet 35. The carafe is then slid into position on the base, causing tube 61 to engage with and open valve 47. The water then flows into tube 61, being controlled by appropriate check valves, if necessary, and enters hot water heater 63. As the water is heated, it enters the water discharge tube 67 and passes upwardly through riser, and is discharged through disc 91 to the coffee. The finished beverage passes through the bottom of basket 85, through funnel 33 into the inner chamber 19. The coffee is kept hot by heater 73 and is thermally insulated by outer chamber 23. When coffee is wanted, the carafe is removed from the base, and the coffee poured through spout 29.

I claim:

1. A coffeemaker including a stand and an interfitting carafe,
   said stand having a base, a riser, and a top section
   said carafe having an inner wall and an outer wall with a bottom therefor, said inner wall defining an inner chamber, said outer wall, and said inner wall defining an outer chamber,
   means for transferring water from said outer chamber to said base, heating means within said base for heating said water, and means for transferring said heated water through said riser to said top section, and
   coffee brewing means in said top section for brewing coffee from said water and transferring said coffee to said inner chamber,
   whereby said outer chamber can be filled with water and said water converted to coffee and returned to said inner chamber.

2. A coffeemaker as set forth in claim 1 in which the capacities of said inner chamber and of said outer chamber are substantially the same.

3. A coffeemaker as set forth in claim 1 in which said inner chamber and said outer chamber are concentric.

4. A coffeemaker as set forth in claim 1 including a glass container and in which said inner wall is part of said glass container, and a supporting wall to hold said glass container in position within said outer chamber.

5. A coffeemaker as set forth in claim 4 including a spout from said glass container.

6. A coffeemaker as set forth in claim 1 in which said bottom of said carafe includes a horizontal recess and said base includes an upper surface shaped and dimensioned to complement said horizontal recess,
   whereby said carafe can be slidingly engaged with said base to a predetermined position.

7. A coffeemaker as set forth in claim 6 in which the height of said carafe is such that, when said carafe is in said predetermined position, the top of said carafe is nearly contiguous with the bottom of said top section.

8. A coffeemaker as set forth in claim 6 including a heating element at the top of said upper surface for maintaining the temperature of coffee in said inner chamber.

9. A coffeemaker as set forth in claim 1 in which said means for transferring water from said outer chamber to said base is a receiving tube in said base and a valve in said outer chamber, said tube and said valve being so positioned relative to one another that said tube and said valve interengage when said carafe is positioned on said base.

10. A coffeemaker as set forth in claim 1 including a water inlet for said outer chamber, said water inlet having a hinged cover therefor shaped to act as a baffle to prevent incoming water from entering said inner chamber, and a trough to guide water into said outer chamber.

11. A coffeemaker as set forth in claim 1 including a top for said carafe, said top being configured as a funnel leading to said inner chamber.

12. A coffeemaker including a stand and an interfitting carafe,
said stand including a base, a vertical riser secured to said base, and a top section supported by said riser, said top section including coffee brewing means, said bottom section including water heating means, and a conduit to carry water from said water heating means through said riser to said coffee brewing means,
said carafe having a water chamber and a brewed chamber, interconnecting means to interconnect said water chamber with said water heating means, and means permitting coffee from said brewing means to flow into said brewed coffee chamber.

13. A coffeemaker as set forth in claim 12 in which said brewed coffee chamber is inside said water chamber.

14. A coffeemaker as set forth in claim 13 in which said chambers are concentric.

15. A coffeemaker as set forth in claim 12 in which said brewed coffee chamber is a glass container.

16. A coffeemaker as set forth in claim 15 in which said brewed coffee chamber is inside said water chamber and said glass container includes a spout extending over said water chamber.

17. A coffeemaker as set forth in claim 12 including means for precisely positioning said carafe on said base.

18. A coffeemaker as set forth in claim 17 in which said positioning means are a horizontal recess on the bottom of said carafe having sliding and complementary interfit with the upper surface of said base.

19. A carafe for use in a coffeemaker, said carafe including
a water chamber and a coffee chamber proximate to one another and concentric with one another, inlet means associated with said water chamber, valve means at the bottom of said water chamber for allowing water to flow from said water chamber into said coffeemaker while said carafe is positioned in said coffeemaker and preventing such flow when said carafe is not positioned in said coffeemaker, and a pouring spout proximate to the upper edge of said coffee chamber,
whereby water for brewing coffee may be held in said water chamber and brewed coffee may be held in said coffee chamber.

20. A carafe as set forth in claim 19 in which said coffee chamber is a glass container.

21. A carafe as set forth in claim 19 in which said water chamber surrounds said coffee chamber.

22. A carafe as set forth in claim 21 wherein said pouring spout from said coffee chamber passes over said water chamber.

23. A carafe as set forth in claim 19 in which said chambers are circular in cross-section, with said water chamber surrounding said coffee chamber.

24. A container for use in a coffeemaker, said container including
a water chamber and a coffee chamber proximate to one another and forming a carafe insertable in and removable from a coffeemaker, inlet means associated with said water chamber, outlet valve means associated with said water chamber at the bottom thereof, said outlet valve means preventing water flow from said water chamber when said carafe is removed from said coffeemaker, and an outlet spout associated with said coffee chamber, said chambers being concentric with one another,
whereby water for brewing coffee may be held in said water chamber and brewed coffee may be held in said coffee chamber.

25. A container as set forth in claim 24 in which said coffee chamber is a glass container.

26. A container as set forth in claim 24 in which said water chamber surrounds said coffee chamber.

27. A container as set forth in claim 24 in which said chambers are circular in cross-section, with said water chamber surrounding said coffee chamber.

* * * * *